US007698239B2

(12) United States Patent
Lieuallen et al.

(10) Patent No.: US 7,698,239 B2
(45) Date of Patent: Apr. 13, 2010

(54) SELF-EVOLVING DISTRIBUTED SYSTEM PERFORMANCE USING A SYSTEM HEALTH INDEX

(75) Inventors: Brian R. Lieuallen, Redmond, WA (US); Geogy A. Samuel, Kirkland, WA (US); Noah Norton, Sammamish, WA (US); Sandeep Kishan Singhal, Kirkland, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 11/413,538

(22) Filed: Apr. 28, 2006

(65) Prior Publication Data

US 2006/0262726 A1 Nov. 23, 2006

Related U.S. Application Data

(63) Continuation-in-part of application No. 11/089,894, filed on Mar. 25, 2005.

(51) Int. Cl.
*G06F 15/18* (2006.01)
*G06E 1/00* (2006.01)
*G06E 3/00* (2006.01)

(52) U.S. Cl. ...................................... 706/16
(58) Field of Classification Search ............ 706/16
See application file for complete search history.

(56) References Cited

U.S. PATENT DOCUMENTS

| 4,874,963 | A | 10/1989 | Alspector |
| 5,293,457 | A | 3/1994 | Arima et al. |
| 6,725,281 | B1 | 4/2004 | Zintel et al. |
| 6,779,004 | B1 | 8/2004 | Zintel |
| 6,892,230 | B1 | 5/2005 | Gu et al. |
| 2002/0027569 | A1 | 3/2002 | Manni et al. |
| 2002/0112058 | A1 | 8/2002 | Weisman et al. |
| 2002/0143989 | A1 | 10/2002 | Huitema et al. |
| 2003/0055892 | A1 | 3/2003 | Huitema et al. |
| 2003/0056093 | A1 | 3/2003 | Huitema et al. |
| 2003/0056094 | A1 | 3/2003 | Huitema et al. |
| 2003/0097425 | A1 | 5/2003 | Chen |
| 2003/0117433 | A1 | 6/2003 | Milton et al. |
| 2003/0126256 | A1* | 7/2003 | Cruickshank et al. ....... 709/224 |
| 2003/0204742 | A1 | 10/2003 | Gupta et al. |
| 2004/0111469 | A1 | 6/2004 | Manion et al. |
| 2004/0148333 | A1 | 7/2004 | Manion et al. |

(Continued)

OTHER PUBLICATIONS

"Artificial Neural Network," Wikipedia Encyclopedia, http://en.wikipedia.org/wiki/Artificial_neural_network (Mar. 14, 2006).

(Continued)

*Primary Examiner*—David R. Vincent
*Assistant Examiner*—Li-Wu Chang
(74) *Attorney, Agent, or Firm*—Marshall, Gerstein & Borun LLP

(57) ABSTRACT

In a distributed computing system, an artificial intelligence system may be employed to configure the network variables. A metric describing the overall system performance may be derived during network operation or simulation and compared to an ideal metric describing the same distributed system performance. The difference between the derived metric and the ideal metric may then be used with an artificial intelligence system to modify the network variables to evolve the system toward the ideal performance standard.

20 Claims, 6 Drawing Sheets

U.S. PATENT DOCUMENTS

| | | | |
|---|---|---|---|
| 2004/0249907 | A1 | 12/2004 | Brubacher et al. |
| 2004/0255029 | A1 | 12/2004 | Manion et al. |
| 2004/0260800 | A1 | 12/2004 | Gu et al. |
| 2005/0013244 | A1* | 1/2005 | Parlos ..................... 370/229 |
| 2005/0022210 | A1 | 1/2005 | Zintel et al. |
| 2005/0074018 | A1 | 4/2005 | Zintel et al. |
| 2005/0097503 | A1 | 5/2005 | Zintel et al. |
| 2005/0157659 | A1 | 7/2005 | Huitema |
| 2005/0223102 | A1* | 10/2005 | Zhang et al. ............. 709/228 |

OTHER PUBLICATIONS

Zhang et al. "Brushwood: Distributed Trees in Peer-to-Peer Systems" (Mar. 2006).
"Explorations in Parallel Distributed Processing," McClelland et al., The Massachusetts Institute of Technology, 1988.
"Neural Network," Wikipedia Encyclopedia, http://en.wikipedia.org/wiki/Neural_network (Mar. 16, 2006).
"Genetic algorithm," http://en.wikipedia.org/wiki/Genetic_algorithm (Mar. 2006).
"Genetic algorihm," http://www.google.com/search?sourceid-navclient&ie-UTF-8&rls-GGLG,GGLG:Mar. 2005 (Mar. 2006).
"Distributed hash table," http://en.wikipedia.org/wiki/Distributed_hash_table (Mar. 2006).
"Latency," http://whatis.techtarget.com/definition/0,,sid9_gci212456,00.html (Mar. 2006).
Ng, T.S., et al., "Towards Global Network Positioning," Extended Abstract, ACM SIGCOMM Internet Measurement Workshop 2001, San Francisco, CA, Nov. 2001.
Ng, T.S., et al., "Predicting Internet Network Distance with Coordinates-Based Approaches," INFOCOM'02, New York, NY, Jun. 2002.
"Peer-to-Peer Infrastructure: Identity Manager Functions," Microsoft, http://msdn.microsoft.com/library/en-us/p2psdk/p2p/identity_manager_functions.asp?frame.
Ng, T.S., et al., "Global Network Positioning: A New Approach to Network Distance Prediction," Student Poster, SIGCOMM'01, San Diego, Ca Aug. 2001.
Costa et al. "PIC: Practical Internet Coordinates for Distance Estimation," ICDCS 2004 (Mar. 2004).
"Peer-to-Peer Infrastructure: Grouping API Functions," Microsoft, http://msdn.microsoft.comilibrary/en-us/p2psdk/p2p/grouping_api_functions.asp?frame=true.
"The Cable Guy—Nov. 2003: Windows Peer-to-Peer Networking," Microsoft Technet, http://www.microsoft.com/technet/community/columns/cableguytcg1103.mspx.
Dabek, F., et al., "Vivaldi: A Decentralized Network Coordinate System," SIGCOMM 2004, Aug 2004.
Cox, R., et al., "Practical, Distributed Network Coordinates," HotNets Workshop, 2003.
"Peer-to-Peer Infrastructure: Creating a Group Chat Application," Microsoft, http://msdn.microsoft.com/library/en-us/p2psdk/p2p/creating_a_group_chat_application.asp. . .
Ng, T.S., et al., "A Network Positioning System for the Internet," USENIX Annual Technical Conference 2004, Boston, MA, Jun. 2004.
"Peer-to-Peer Infrastructure: PeerGroupEnumMembers," Microsoft, http://msdn.microsoft.com/library/en-us/p2psdk/p2p/peergroupenummembers.asp?frame=true.

* cited by examiner

SELF-EVOLVING DISTRIBUTED SYSTEM PERFORMANCE USING A SYSTEM HEALTH INDEX

This application is a continuation-in-part of prior application Ser. No. 11/089,894, "System and Method for Monitoring and Reacting to Peer-to-Peer Network Metrics" to Horton et al., filed Mar. 25, 2005.

BACKGROUND

Distributed computer systems may operate in a distributed environment where many different systems or nodes communicate across a network to perform common tasks. Particularly, a distributed system is a collection of independent computers that appears to its users as a single coherent system; the individual differences between other system members as well as the system's internal organization may be hidden. Furthermore, users and applications may interact with a distributed system in a consistent and uniform way, regardless of where and when the interaction takes place. These systems may also be substantially scalable as no single element may control the system's behavior. Further, distributed systems may be continuously available, although an individual member may become temporarily or permanently unusable. Users or applications of a distributed system may not notice or control system maintenance or system performance. In short, a distributed system may easily connect users with resources, it may hide the fact that resources are distributed across a network, it may be open, and it may be scalable.

For example, the Internet Domain Name System (DNS) is an example of a widely-used distributed system. DNS is primarily used for looking up Internet host addresses and mail servers. The system is hierarchically organized as a rooted tree. Each node or leaf in the tree is associated with resource records that hold the information associated with the domain name. One of the functions of the DNS is associating Internet protocol addresses with domain names. The DNS is implemented as a hierarchical set of servers wherein each domain or subdomain has one or more authoritative DNS servers that publish information about that domain and the name servers of any domains beneath it. To resolve a domain name, a local host need only have information concerning the topmost DNS server. The local host will query the topmost DNS server for the location of a particular domain. The topmost DNS server, in turn, will point the requesting entity to a lower-level server of the DNS until the domain name is finally resolved. Therefore, the task of resolving Internet domain names may be distributed across several nodes of the DNS.

The Peer Name Resolution Protocol (PNRP) is another example of a distributed system. P2P distributed systems may be composed of many individual peer computers called nodes. PNRP may enable each node to dynamically publish and resolve names, register multiple names on a node, register multiple computers to a single name, and register names for applications.

Regardless of the distributed system, network variables that may be generally transparent to the individual user may determine how data propagates through the system and how each node processes the data. For example, a node "timeout" variable may define how long the node may try to connect to another node before recognizing connection success or failure. Also a system may share a common, Distributed Hash Table (DHT) of key/value pairs. Distributed hash tables may partition ownership of the keys among system nodes and may efficiently route messages or files to the unique owner of any given key. Each node may be associated with a "keyspace" or set of unique keys, and each node may store data associated with all keys in the node's keyspace. However, a system implementing a DHT may behave differently depending on the value of a network variable setting the size of the keyspace. For example, a system including a network variable that assigns only one key to each node may result in very high data lookup costs, while a system with many keys assigned to each node may require each node to store a large amount of data. For any distributed system using a DHT, the overall system may behave differently by either globally or locally adjusting the keyspace assignment variable.

Finally, P2P systems may maintain a routing table at each node to direct messages traveling through the network. However, each node may not need to store a routing table describing every system node to achieve a suitable level of accurate message routing. A system allowing a very large routing table may route messages more efficiently because each node will have more information about the location of a destination node. However, maintaining the accuracy of a large routing table may be too cumbersome for the system. Each time the routing table must be refreshed, the table information must be transmitted to each participating node. As more nodes are represented on the routing table, more nodes must necessarily receive the new routing table information. Likewise, a system allowing a small routing table may be less cumbersome for system maintenance, but messages will take much longer to arrive at their destination node because each node only has a limited amount of information concerning the location of other nodes on the network. Further, this increase in transmission time may result in more lost or "timed out" messages depending on the value of the previously-described system timeout variable. As messages take more time to propagate through the network, the message may exceed the network timeout variable. Many other system variables that are transparent to the user may affect the overall performance of the distributed system.

As explained above, each network variable may individually affect the performance of the distributed system, however, each variable may also interact with other network variables. The variables may be changed and the distributed system may be observed in operation or simulation to determine the effect of the variable adjustment on the system performance. The performance of a distributed system may be monitored or recorded by the method disclosed in U.S. application Ser. No. 11/089,894, "System and Method for Monitoring and Reacting to Peer-to-Peer Network Metrics" to Horton et al., the entire disclosure of which is hereby incorporated by reference. The distributed system performance may be generally described as a system "health index."

SUMMARY

Modifying network variables while simultaneously monitoring or considering the system performance may result in a more efficient distributed system. In a distributed computing system, an artificial intelligence system may be employed to configure the network variables. A metric describing the overall system performance may be derived during network operation or simulation and compared to an ideal metric describing the distributed system performance. The difference between the derived metric and the ideal metric may then be used to modify the network variables to evolve the system toward the ideal performance standard. The complex and multiply-dependent characteristics of network variables may be analyzed and optimized using the node interaction of a neural network. By employing artificial intelligence approaches, the method may allow a distributed system to automatically modify and evolve during operation or simulation to improve performance. The method, device, and computer storage medium comprising computer-executable instructions may modify network variables to improve the performance or system health of a distributed computing system, including a peer-to-peer network, toward an ideal performance standard. System metrics (as determined by system variables that modify the system metrics) may be aggregated to measure the system health during operation of the system. The measured system health may then be compared to an ideal system health to determine an error index between the measured and ideal. The variables of at least the slow or failing nodes of the system may then be modified to be closer to the ideal through neural network back propagation to derive new improved system variables. The improved variables may then be applied to the distributed system.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
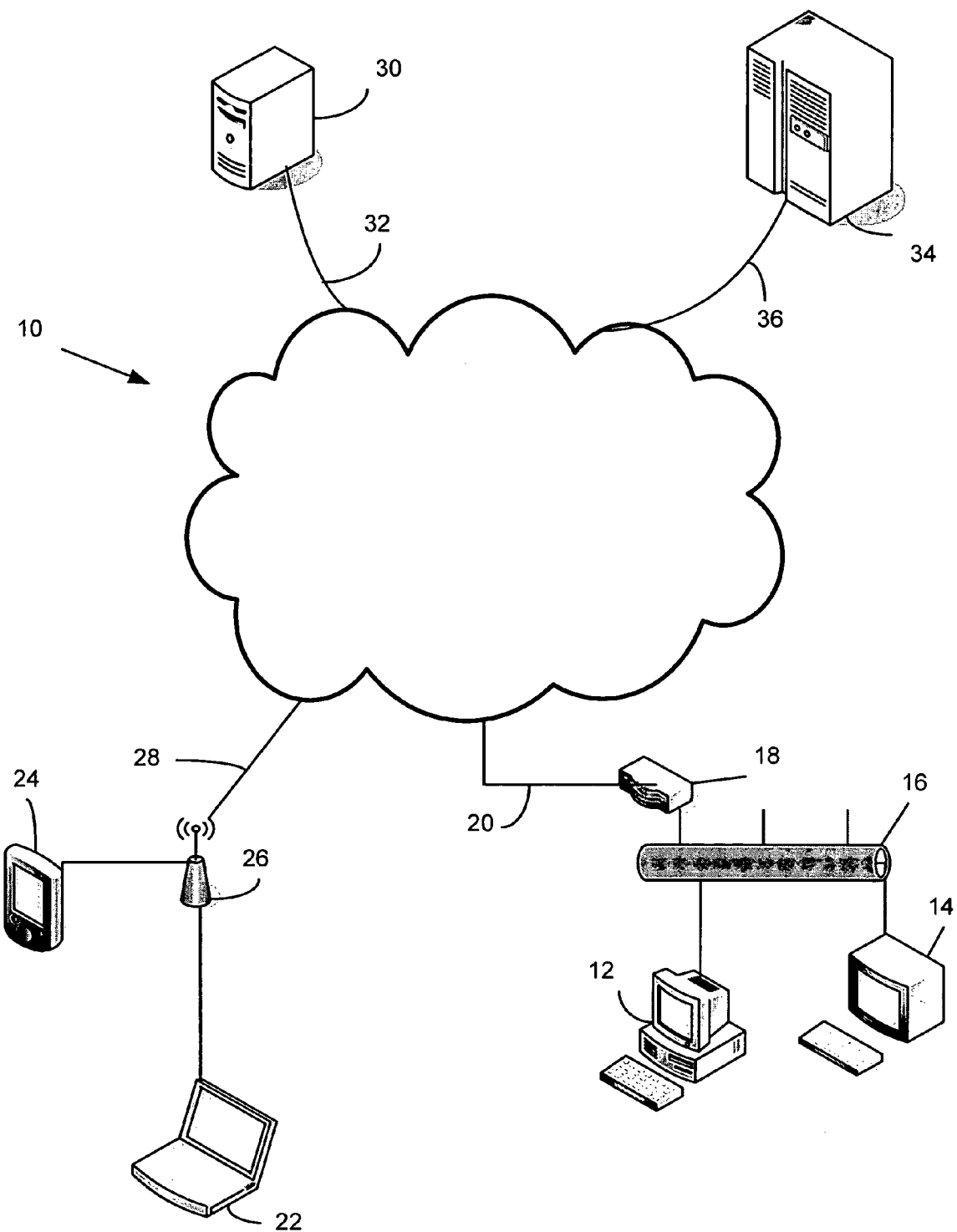
FIG. 1 is a diagram of one example of a distributed system.

FIG. 1 illustrates a network 10 that may be used to support a distributed system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
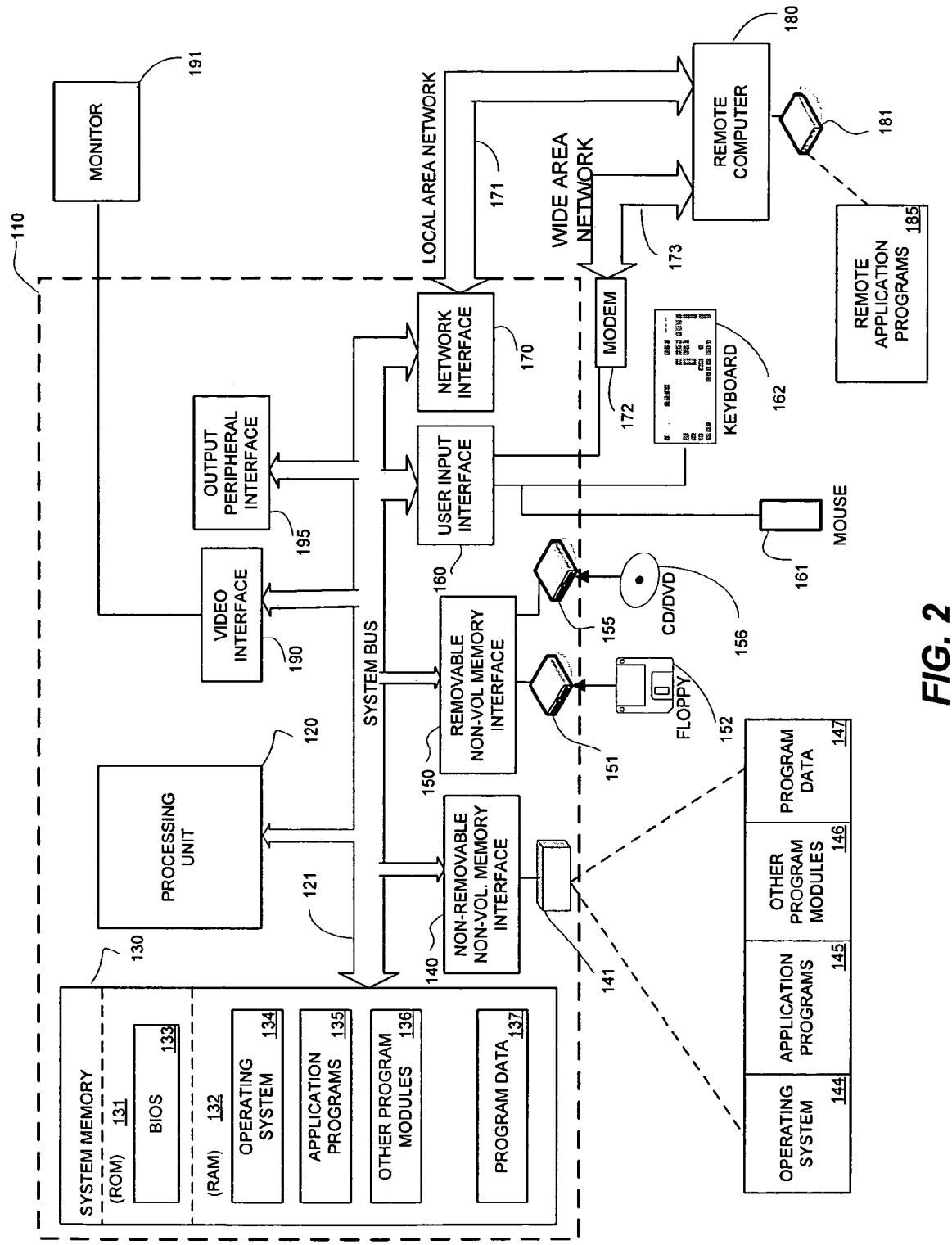
FIG. 2 is a block diagram of one example of a computing system that may operate in accordance with the claims.

FIG. 2 illustrates a computing device in the form of a computer 110 that may be connected to the network 10 and may participate in a distributed system. Further, FIG. 2 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect Express (PCI-E) bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically-includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

A method and apparatus for evolving a distributed system may execute or reside on a computing device 110 or a remote computing device 180 as an application in memory. For example, the method and apparatus may execute or reside in system memory 130 and may include, without limitation, an application in the BIOS 133, operating system 134, application programs 135, other program modules 136, and the program data 137. Additionally, the method and apparatus may execute or reside in non-removable, non-volatile memory 141 and may operate as part of, without limitation, the operating system 144, application programs 145, other program modules 146, or the program data 147. Further, the method and apparatus may execute or reside in removable, non-volatile memory 151, 155 such as a floppy disk 152 or an optical disk 156. The method and apparatus may also relate to remote application programs 185 executing on the remote computer 180. Additionally the method and apparatus may relate to any hardware device, interface, network connection, internal or external connection associated with the computers 110, 180.

Figure 3:
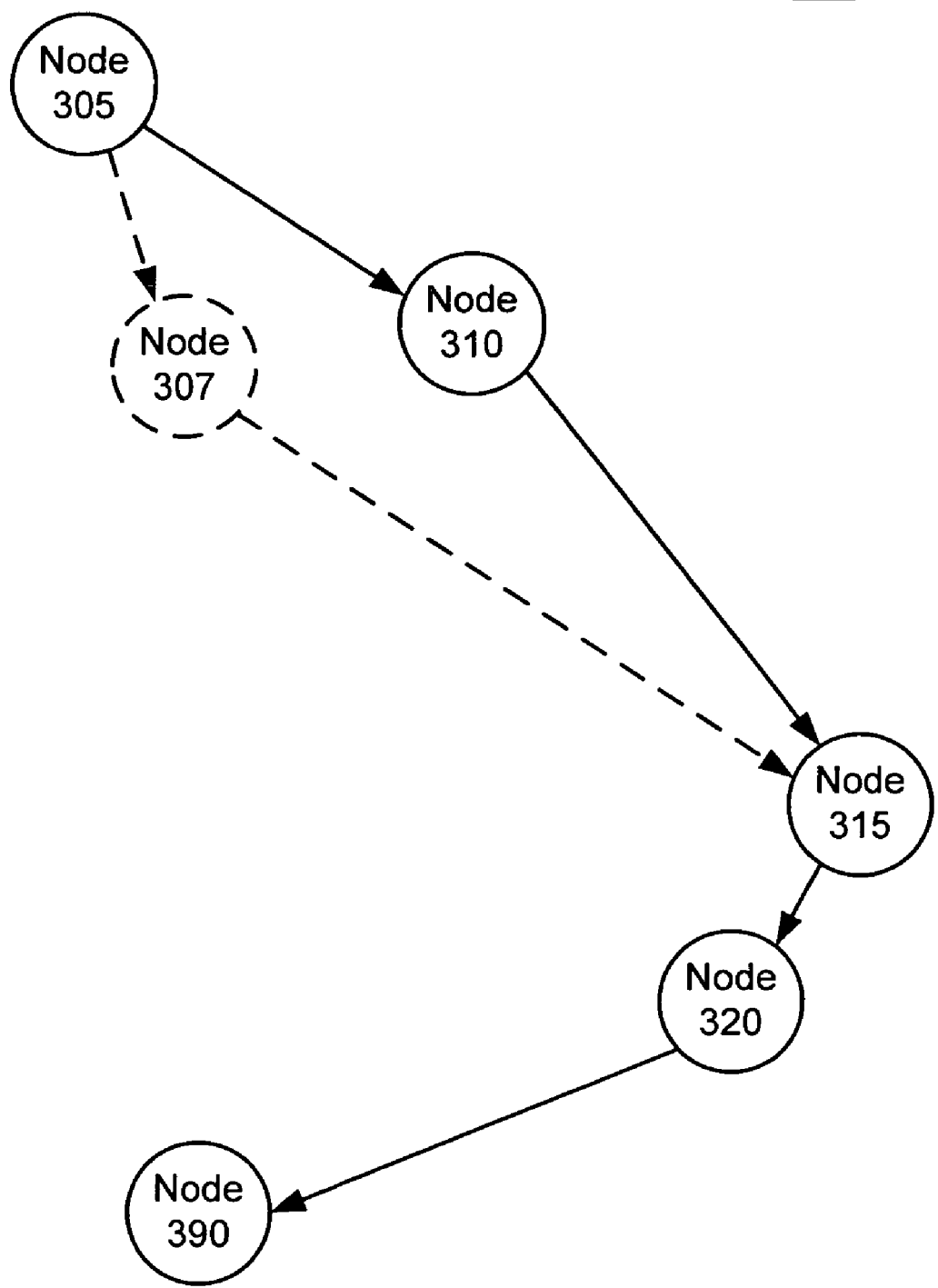
FIG. 3 is a diagram of one example of a peer-to-peer network.

FIG. 3 is a diagram of nodes, such as the computers described in FIGS. 1 and 2, participating in a distributed system 300. The distributed system 300 may be a point-to-point peer-to-peer network, with communication between nodes on a one-to-one basis. The distributed system 300 may also be a multicast peer-to-peer network, with communication on a one-to-many basis. Each node may have a cache of known other nodes. In general, nodes are likely to have more information about nodes closer to them than nodes farther away for some metric of proximity, for example, numerical proximity. When a first node searches for another node, it may first ask neighbors numerically closer to the destination if they have data regarding the target node. If the neighbor node does, it may be asked to forward the message or request. To illustrate using FIG. 3, node 305 is trying to connect to node 390. Node 305 may first ask node 310 to forward a message on its behalf. Node 310 does not know about node 390 but has in its cache an entry for node 315, which has a closer peer-to-peer identifier to node 390. Node 315 may then forward the message to node 320. Node 320 has a cache entry for node 390 and forwards the message to the ultimate destination. In this example, each node was progressively closer to the destination node. While this is not always the case, and some retries may occur, this is sufficient to illustrate the basic routing scheme. On a small scale this distributed system is relatively simple to construct and maintain. However, when scaled to millions or hundreds of millions of nodes, the performance of the network fabric may become difficult to evaluate when making changes to the hardware and software of the distributed system.

Figure 4:
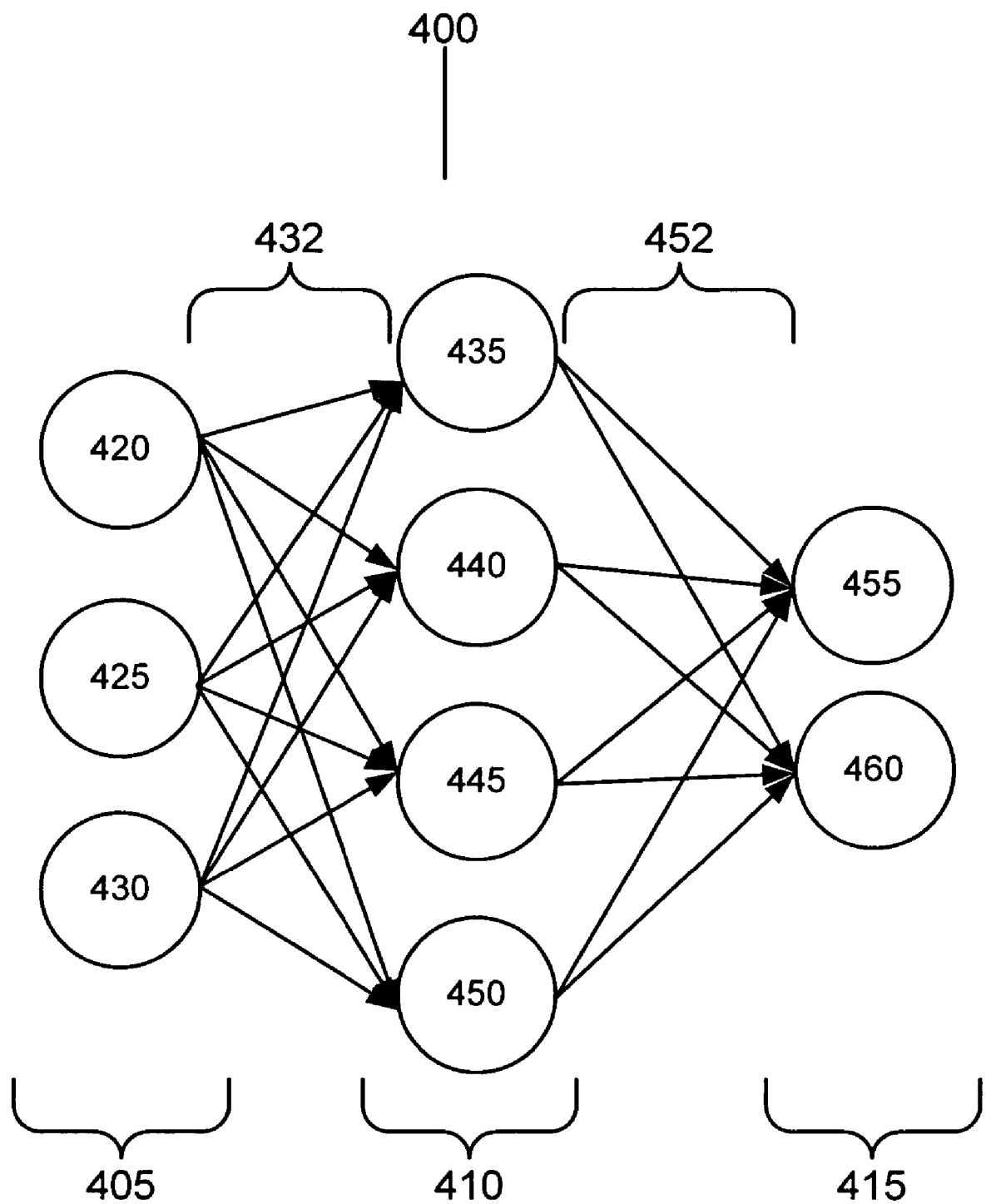
FIG. 4 is a diagram of one example of a neural network.
Figure 5:
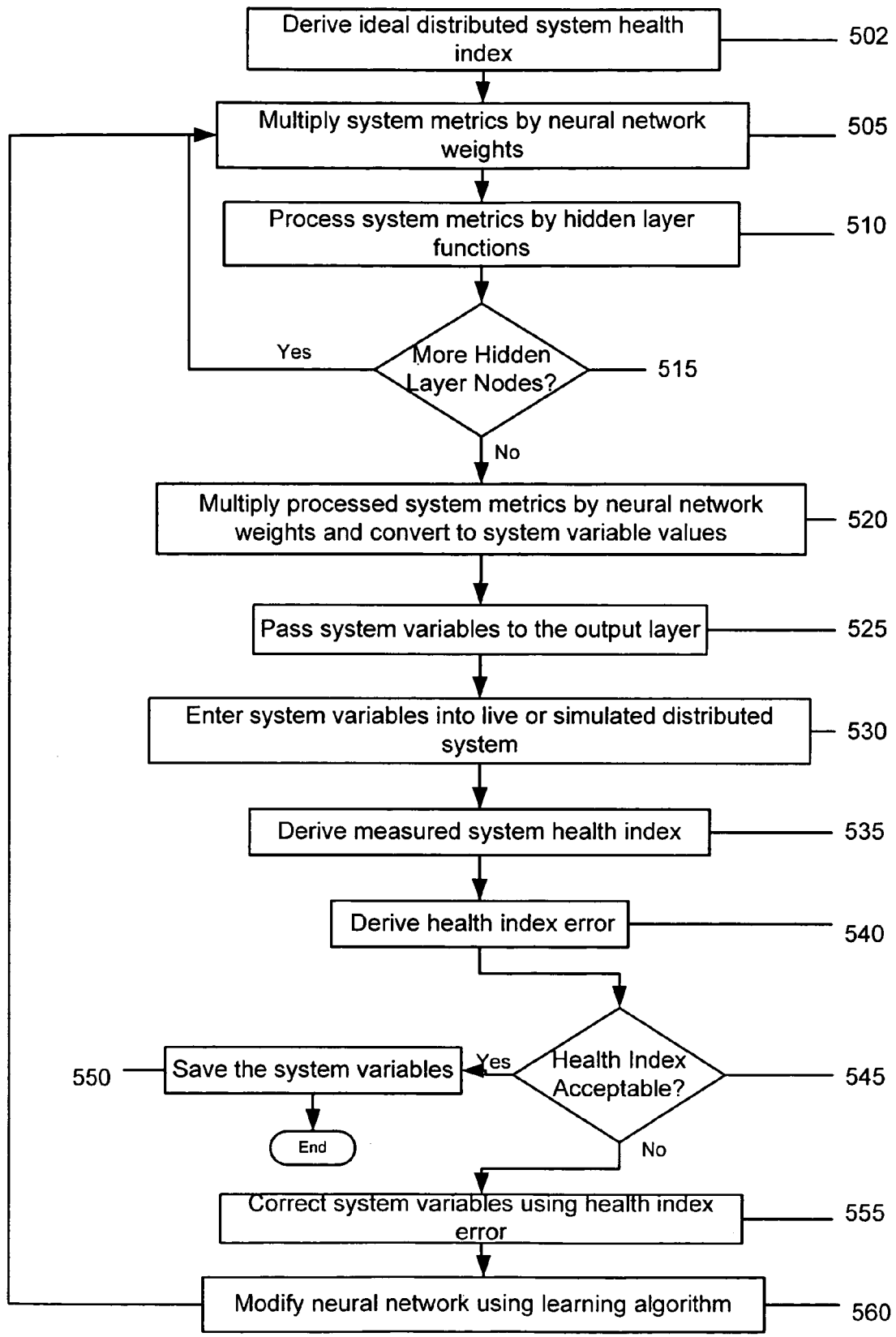
FIG. 5 is a flowchart describing a method of one example of improving a distributed system's performance.

With reference to FIG. 4 and FIG. 5, variables affecting the performance of the distributed system 300 may be dynamically derived through a neural network 400, and the neural network 400 may represent the complex interaction of multiple network variables. The neural network 400 may derive an optimal set of system variables, save the variables, and use the derived variables in future system operations.

A neural network may be an interconnected group of computational units generically referred to as "nodes" (noting that the use of the term "node" in reference to the neural network is different than the "node" associated with distributed systems), or neurons, that uses a mathematical model for information processing based on a connectionist approach to computation. A neural network may be an adaptive system that changes its structure based on external or internal information that flows through the network. More generally, a neural network may be a non-linear statistical modeling tool that may model complex relationships between inputs and outputs or it may find patterns in data.

A simple neural network 400 may have three layers: an input layer 405, a hidden layer 410, and an output layer 415. The neural network 400 of FIG. 4 is for illustration purposes only and persons having ordinary skill in the art should recognize that the system disclosed herein may utilize a neural network having multiple hidden layers and any number of inputs, nodes, and outputs at each layer described depending on the complexity of the system that the neural network 400 describes. The input layer 405 may represent a starting point for the input of different system metrics 420, 425, 430. The metrics may be a numerical representation or the performance of a particular portion or all of a distributed system. The metrics may be generally described by U.S. patent application Ser. No. 11/089,894 entitled "System and Method for Monitoring and Reacting to Peer-to-Peer Network Metrics" to Horton, et al. and may include a distributed system number of nodes, an average system latency, an average packet loss, system operation frequencies, cache churn rates, or any other quantifiable aspect of the system performance.

At step 502, an ideal system health index may be derived according to U.S. patent application Ser. No. 11/089,894 entitled "System and Method for Monitoring and Reacting to Peer-to-Peer Network Metrics" to Horton, et al., or via some other algorithm. The ideal system health index may represent a distributed system that is optimized for a particular system metric, or optimized for an overall system performance. The ideal system health index may represent any desired performance characteristic of the distributed system 300 and may be described as a quantifiable representation of a user-desired performance characteristic of the distributed system 300.

At step 505, the system metrics 420, 425, 430, may be multiplied by weights 432 as they pass from the input layer 405 to the hidden layer 410. As illustrated in FIG. 4, each arrow comprising the weights 432 may represent a different weight by which each system metric 420, 425, 430, may be multiplied. Therefore, each metric 420, 425, 430, may be represented as an n-dimensional vector, where "n" represents the number of nodes at the hidden level. In this example, each system metric 420, 425, 430, may be represented by a 4-dimensional vector (four hidden layer 410 nodes) after being processed by the weights 432.

At step 510, the system metrics 420, 425, 430, may be further processed by functions at each hidden node 435, 440, 445, 450. The functions at the hidden nodes may represent the complex interaction of the system metrics 420, 425, 430, or any other system metrics, and may account for multiple system metric dependencies. For example, the function at hidden node 435 may represent the previously-described relationship between system packet loss and the number of system nodes.

At step 515, if the neural network 400 includes additional hidden layers 410, the system metrics 420, 425, 430 may be multiplied by additional weights and processed by additional functions as in step 505 and 510 at subsequent hidden layer nodes.

At step 520, if there are no additional hidden layer 410 nodes, the results from each hidden node 435, 440, 445, 450, may again be multiplied by weights 452 and converted into distributed system variables 455, 460.

At step 525, the distributed system variables 455 and 460 are passed to the output layer 415 as an n-dimensional vector (here, a 2-dimensional vector) represented at nodes 455 and 460. The neural network 400 may result in any number of output layer 415 nodes representing values for individual network variables or combinations of network variables. The system variables may include a node timeout value, a DHT keyspace value, a routing table size, or any other value that may be used to modify the performance of a particular distributed system node or combination of nodes.

At step 530, the system variable values 455, 460, may then be used to modify the performance of either a live or simulated distributed system 300. The simulated or live distributed system may then be observed for its performance.

At step 535, the metrics describing the performance of the distributed system 300 with the derived network variables 455, 460, may be aggregated into a measured system health index as described in paragraphs 25-29 of U.S. patent application Ser. No. 11/089,894 entitled "System and Method for Monitoring and Reacting to Peer-to-Peer Network Metrics" to Horton, et al., or via another algorithm. Instrumentation at the distributed system 300 nodes, or a subset of the nodes, may collect performance statistics about the particular node. Individual node statistics may be reported to a system controller at an individual system node, or may be sent to a node outside of the distributed system 300 where the statistics may be aggregated or configured into a distributed system health index.

At step 540, the measured system health index may be compared against the ideal system health index as described at step 502 to derive a health index error value.

At step 545, if the health index error value falls into a range of acceptable tolerance or matches the ideal system health index of step 502, then, at step 550, the method may save the derived network variables 455, 460 and use them in future distributed system 300 operations, thus ending the method.

At step 555, if the health index does not indicate an optimal or acceptable distributed system 300 performance, the health index error value may be used as a correction factor for the values of the distributed system variables 455, 460 derived by the neural network in step 515.

At step 560, the corrected distributed system variables may be used in a learning algorithm to modify the neural network 400 to derive a set of system variables 455, 460, that may result in a distributed system that may perform more closely to the ideal health index derived in step 502. One example of a suitable neural network learning algorithm may be the back propagation algorithm described in "Explorations in Parallel Distributed Processing", Rumelhart, et al., MIT Press, 1988 the entire disclosure of which is hereby incorporated by reference. After completing step 560, the method may return to step 505 to modify the neural network 400 and re-calculate the network variables.

Figure 6:
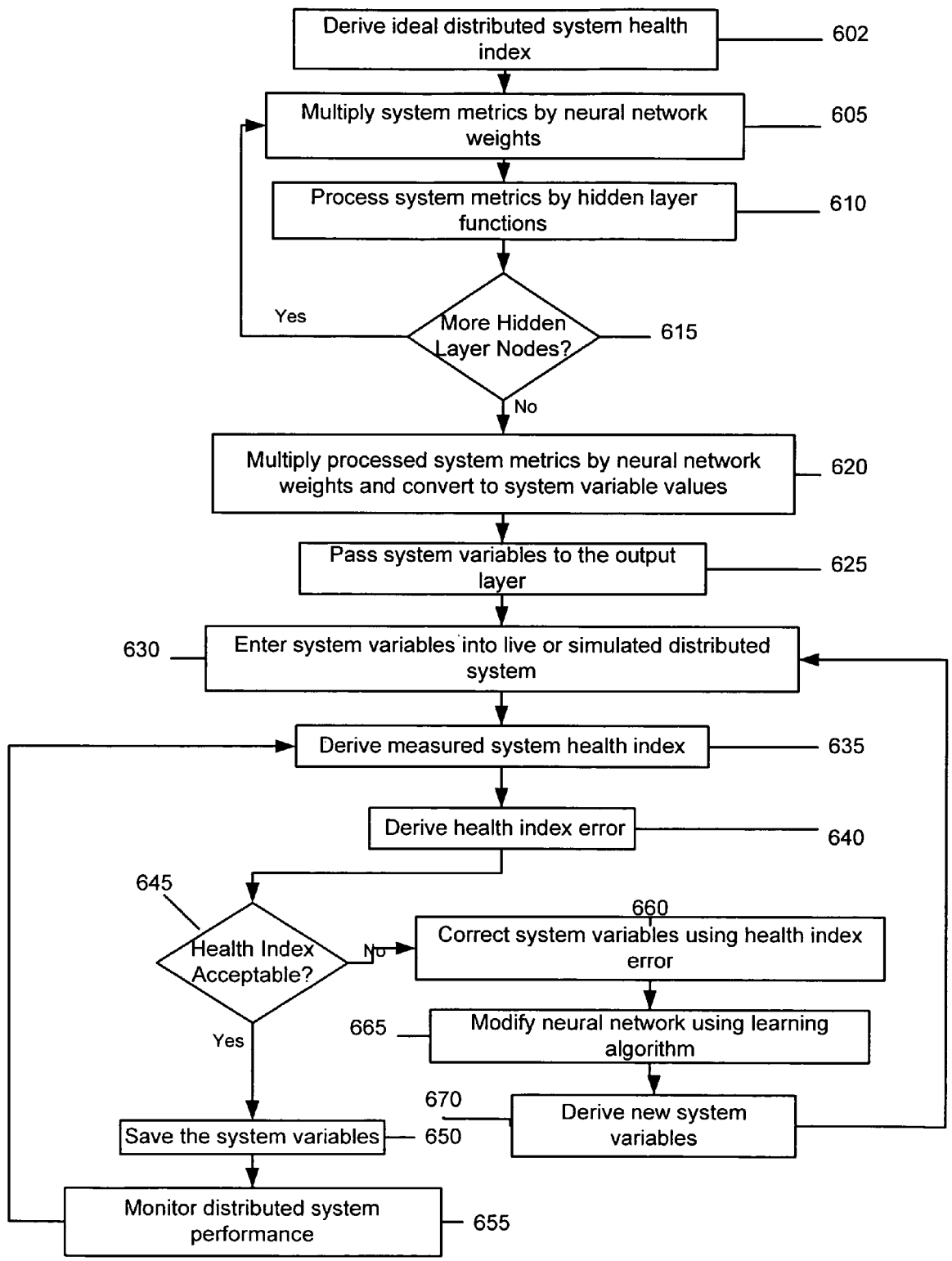
FIG. 6 is another flowchart describing a method of one example of improving a distributed system's performance.

With reference to FIG. 4 and FIG. 6, a neural network 400 may continuously or periodically evolve the network variables 455, 460 of a simulated or live distributed system 300 to adapt to changing distributed system 300 configurations.

At step 602, an ideal system health index representing a distributed system that is optimized for a particular system metric, or optimized for an overall system performance may be derived according to U.S. patent application Ser. No. 11/089,894 entitled "System and Method for Monitoring and Reacting to Peer-to-Peer Network Metrics" to Horton, et al. as previously described. At step 605, the system metrics 420, 425, 430, may be multiplied by weights 432 as they pass from the input layer 405 to the hidden layer 410. At step 610, the system metrics 420, 425, 430, may be further processed by functions representing the complex interaction the of system metrics 420, 425, 430, or any other system metrics, and may account for multiple system metric dependencies at each hidden node 435, 440, 445, 450. At step 615, if the neural network 400 includes additional hidden layers 410, the system metrics 420, 425, 430 may be multiplied by additional weights and processed by additional functions as in step 605 and 610 at subsequent hidden layer nodes. At step 620, if there are no additional hidden layer 410 nodes, the results from each hidden node 435, 440, 445, 450, may again be multiplied by weights 452 and converted into distributed system variables 455, 460. At step 625, the distributed system variables 455 and 460 are passed to the output layer 415 resulting in any number of output layer 415 nodes representing values for individual network variables or combinations of network variables. The system variables may include a node timeout value, a DHT keyspace value, a routing table size, or any other value that may be used to modify the performance of a particular distributed system node or combination of nodes. At step 630, the system variable values 455, 460, may then be used to modify the performance of either a live or simulated distributed system 300. The simulated or live distributed system may then be observed for its performance and, at step 635, the metrics describing the performance of the distributed system 300 with the derived network variables 455, 460, may be aggregated into a measured system health index as described in U.S. patent application Ser. No. 11/089,894. At step 640, the measured system health index may be compared against the ideal system health index as described at step 602 to derive a health index error value.

At step 645, if the health index error value falls into a range of acceptable tolerance or matches the ideal system health index of step 602, then, at step 650, the method may save the derived network variables 455, 460 and utilize them in the distributed system operation.

At step 655, the method may monitor the distributed system 300 by observing the distributed system in operation with the variables as determined by the neural network in the previous steps. During monitoring, the method may periodically or continuously derive a measured system health index according to U.S. patent application Ser. No. 11/089,894, paragraphs 25-29, by returning to step 635 and completing the previously-described, subsequent steps.

At step 660, if the health index error value falls outside of an acceptable range or below a threshold tolerance as determined at step 645, the method may determine that the system 300 is not performing optimally, and correct the variables 455, 460 using the health index error as a factor.

At step 665, the method may initiate a suitable learning algorithm to modify the neural network to derive another set of system variables 455, 460 that may reduce the health index error. One suitable neural network learning algorithm may be the back propagation algorithm described in "Explorations in Parallel Distributed Processing", Rumelhart, et al., MIT Press, 1988.

At step 670, after modifying the neural network 400 using a suitable learning algorithm, the method may derive a new set of system variables 455, 460 and return to step 630 to modify the distributed system with the new system variables and continue the remaining steps.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of improving the performance of a distributed computing system comprising:

determining an ideal system health index that is a quantifiable representation of a user-defined performance characteristic of the distributed system, the distributed system comprising a peer-to-peer network including a plurality of nodes, the ideal system health index including a plurality of system performance metrics collected from the plurality of nodes, each metric modified by one or more system variables;

propagating one or more system performance metrics through an artificial intelligence system, the system performance metrics measured during operation of the distributed system, the propagating including:

multiplying each system performance metric by one or more first weights, processing each weighted system performance metric by one or more functions within one or more hidden layers of the artificial intelligence system, each function accounting for the dependence of each system performance metric on one or more other system performance metrics, and converting each weighted and processed system performance metric to a plurality of improved system variables by multiplying each weighted and processed system performance metric by one or more second weights;

modifying one or more system variables with the plurality of improved system variables;

determining a system health index by aggregating the system performance metrics after modifying one or more system variables with the plurality of improved system variables;

comparing the system health index to the ideal system health index to derive a health index error value; and when the health index error value is above a threshold:

identifying a slow or failing node of the plurality of nodes in the peer-to-peer network based on the system health index, correcting the plurality of improved distributed system variables of the slow or failing node by applying the health index error value to the plurality of improved distributed system variables of the slow or failing node;

if the health index error value is below the threshold, saving the improved distributed system variables, modifying the artificial intelligence system by applying a learning algorithm to the artificial intelligence system to reduce the health index error value, the learning algorithm using the health index error value, re-propagating the system performance metrics through the modified artificial intelligence system to derive a second plurality of improved system variables, and applying the second plurality of improved system variables to at least the slow or failing node.

2. The method of claim 1, wherein applying the health index error value to the improved distributed system variables comprises configuring the artificial intelligence system based on a comparison of the system health index and the ideal system health index.

3. The method of claim 1, further comprising:

applying a learning algorithm to the artificial intelligence system after comparing the system health index to the ideal system health index to derive the health index error value; and deriving at least one second improved system variable from the artificial intelligence system after applying the learning algorithm.

4. The method of claim 3 wherein the learning algorithm is a back propagation algorithm.

5. The method of claim 1, wherein the at least one improved system variable comprises a system timeout value, a distributed hash table keyspace size, a routing table size, a maximum number of distributed system nodes, or a maximum number of allowable packet hops.

6. The method of claim 1, wherein the first system health index and the ideal system health index comprises one or more of a number of distributed system nodes, an average distributed system latency, an average distributed system packet loss, an operation frequency, or a distributed system node cache churn rate.

7. The method of claim 1, wherein the distributed system is one of a live distributed system or a simulated distributed system.

8. The method of claim 1, wherein the at least one artificial intelligence system is a neural network.

9. The method of claim 8, wherein the neural network comprises at least one hidden layer node, the at least one hidden layer node comprising the one or more functions, each function representing an interaction between a plurality of system behavior variables.

10. The method of claim 1, wherein instrumentation at each node of the distributed system collects performance metrics for that node.

11. The method of claim 10, further comprising reporting node performance statistics to another node outside the distributed system to aggregate the statistics into the system health index.

12. A computing device comprising:

a processor;

a memory; and an application maintained in the memory and executed on the processor to improve the performance of a distributed computing system, the distributed computing system comprising a peer-to-peer network including a plurality of nodes, the application comprising instructions for:

determining an ideal system health index that is a quantifiable representation of a user-defined performance characteristic of the distributed system, the ideal system health index including a plurality of system performance metrics collected from the plurality of nodes, each metric modified by one or more system variables;

propagating one or more system performance metrics through a neural network including an input layer, one or more hidden layers, and an output layer, the system performance metrics measured during operation of the distributed system, the propagating including:

multiplying each system performance metric by one or more first weights at the input layer, processing each weighted system performance metric by one or more functions within one or more hidden layers of the neural network, each function accounting for the dependence of each system performance metric on one or more other system performance metrics, and converting each weighted and processed system performance metric to a first plurality of improved system variables by multiplying each weighted and processed system performance metric by one or more second weights at the output layer;

modifying the system variables with the first plurality of improved system variables;

determining a system health index by aggregating the system performance metrics after modifying one or more system variables with the first plurality of improved system variables;

comparing the system health index to the ideal system health index to derive a health index error value; and when the health index error value is above a threshold:

identifying a slow or failing node of the plurality of nodes in the peer-to-peer network based on the system health index, correcting the first plurality of improved distributed system variables of the slow or failing node by applying the health index error value to the first plurality of improved distributed system variables of the slow or failing node, modifying the neural network by applying a back propagation algorithm to the neural network, the back propagation algorithm using the health index error value to modify one or more values of the input layer, the hidden layer, and the output layer, and re-propagating the system performance metrics through the modified neural network to derive a second plurality of improved system variables, and applying the second plurality of improved system variables to at least the slow or failing node.

if the health index error value is below the threshold, saving the improved distributed system variables and operating the distributed system using the improved distributed system variables.

13. The computing device of claim 12, wherein the distributed system is one of a live distributed system or a simulated distributed system.

14. The method of claim 12, wherein instrumentation at each node of the distributed system collects performance metrics for that node.

15. The method of claim 14, further comprising reporting node performance statistics to another node outside the distributed system to aggregate the statistics into the system health index.

16. A computer storage medium comprising computer-executable instructions for improving the performance of a distributed computing system, the instructions comprising:

determining an ideal system health index that is a quantifiable representation of a user-defined performance characteristic of the distributed system, the distributed system comprising a peer-to-peer network including a plurality of nodes, the ideal system health index including a plurality of system performance metrics collected from the plurality of nodes, each metric modified by one or more system variables;

propagating one or more system performance metrics through a neural network including an input layer, one or more hidden layers, and an output layer, the system performance metrics measured during operation of the distributed system, the propagating including:

multiplying each system performance metric by one or more first weights at the input layer, processing each weighted system performance metric by one or more functions within one or more hidden layers of the neural network, each function accounting for the dependence of each system performance metric on one or more other system performance metrics, and converting each weighted and processed system performance metric to a plurality of improved system variables by multiplying each weighted and processed system performance metric by one or more second weights at the output layer;

modifying the system variables with the plurality of improved system variables;

determining a system health index by aggregating the system performance metrics after modifying one or more system variables with the plurality of improved system variables;

comparing the system health index to the ideal system health index to derive a health index error value; and when the health index error value is above a threshold:

identifying a slow or failing node of the plurality of nodes in the peer-to-peer network based on the system health index, correcting the plurality of improved distributed system variables by applying the health index error value to the plurality of improved distributed system variables of at least the slow or failing node, modifying the neural network by applying a back propagation algorithm to the neural network, the back propagation algorithm using the health index error value to modify one or more values of the input layer, the hidden layer, and the output layer, and re-propagating the system performance metrics through the modified neural network to derive a second plurality of improved system variables, and applying the second plurality of improved system variables to at least the slow or failing node, if the health index error value is below the threshold, saving the improved distributed system variables and operating the distributed system using the improved distributed system variables.

17. The computer storage medium of claim 16, wherein the computer executable instructions for applying the health index error value to the improved distributed system variables comprises configuring the artificial intelligence system based on the result of comparing the system health index and the ideal system health index.

18. The computer storage medium of claim 16, wherein the improved system variable comprises one or more of a system timeout value, a distributed hash table keyspace size, a routing table size, a maximum number of distributed system nodes, or a maximum number of allowable packet hops.

19. The computer storage medium of claim 16, wherein the distributed system is one of a live distributed system or a simulated distributed system.

20. The computer storage medium of claim 16, wherein the neural network comprises at least one hidden layer node, the at least one hidden layer node comprising a function, the function representing an interaction between multiple system variables.

* * * * *

UNITED STATES PATENT AND TRADEMARK OFFICE
CERTIFICATE OF CORRECTION

PATENT NO. : 7,698,239 B2
APPLICATION NO. : 11/413538
DATED : April 13, 2010
INVENTOR(S) : Brian R. Lieuallen et al.

It is certified that error appears in the above-identified patent and that said Letters Patent is hereby corrected as shown below:

In column 9, line 19, delete "460," and insert -- 460 --, therefor

In column 9, line 62, delete "460," and insert -- 460 --, therefor.

In column 9, line 67, delete "460," and insert -- 460 --, therefor.

In column 11, lines 29-31, in Claim 1, delete "node; if the health index error value is below the threshold, saving the improved distributed system variables," and insert -- node, --, therefor In column 13, lines 9-12, in Claim 12, after "node." delete "if the health index error value is below the threshold, saving the improved distributed system variables and operating the distributed system using the improved distributed system variables.".

In column 14, lines 26-30, in Claim 16, delete "node, if the health index error value is below the threshold, saving the improved distributed system variables and operating the distributed system using the improved distributed system variables." and insert -- node. --, therefor.

Signed and Sealed this
Twenty-fifth Day of January, 2011

David J. Kappos
*Director of the United States Patent and Trademark Office*